April 5, 1960   L. A. OSTERHAUS   2,931,529
FEED MIXER AND UNLOADER UNIT ATTACHMENT FOR WAGONS
Filed April 29, 1958   4 Sheets-Sheet 1
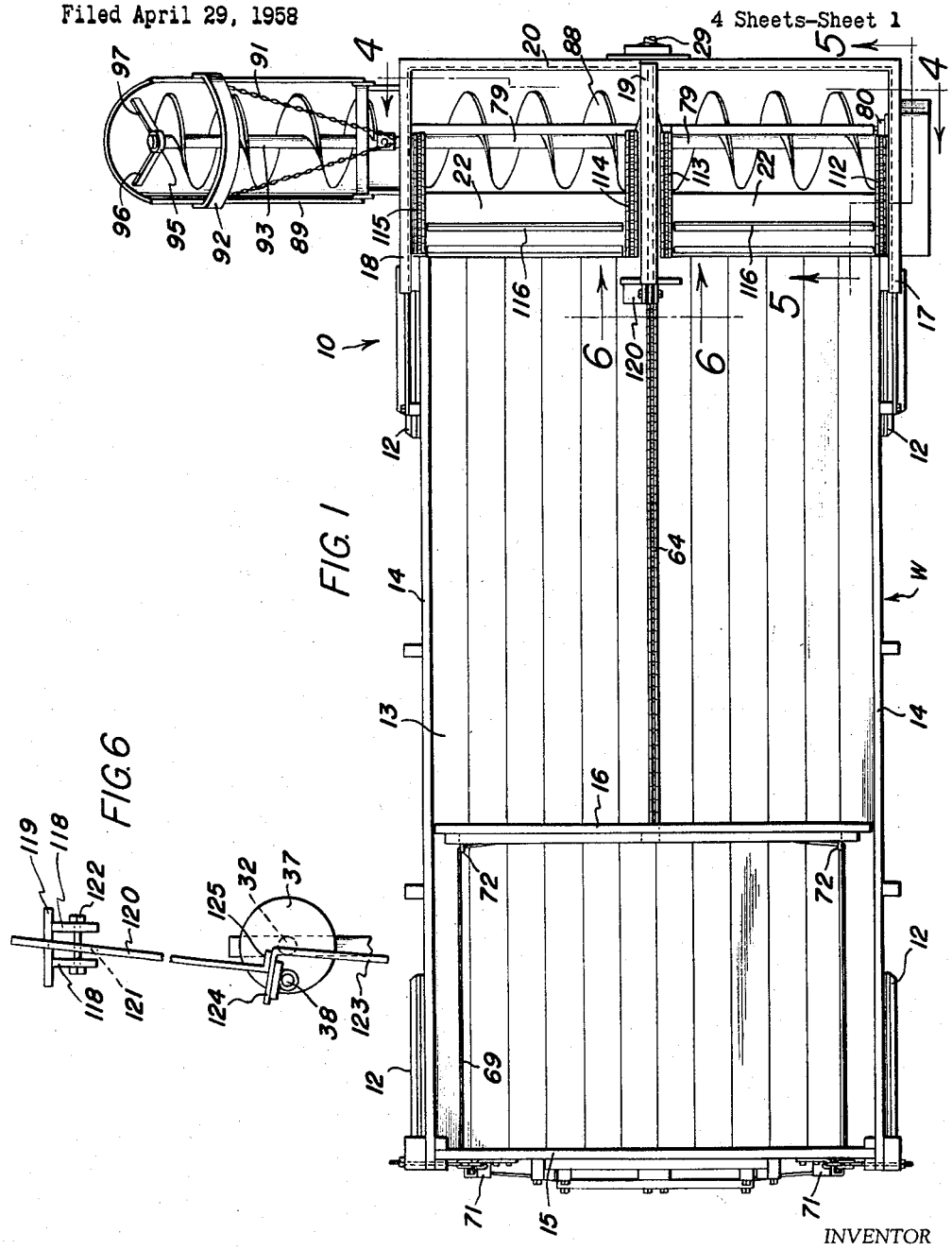
INVENTOR
LEO A. OSTERHAUS
BY  Kimmel & Crowell
ATTORNEYS

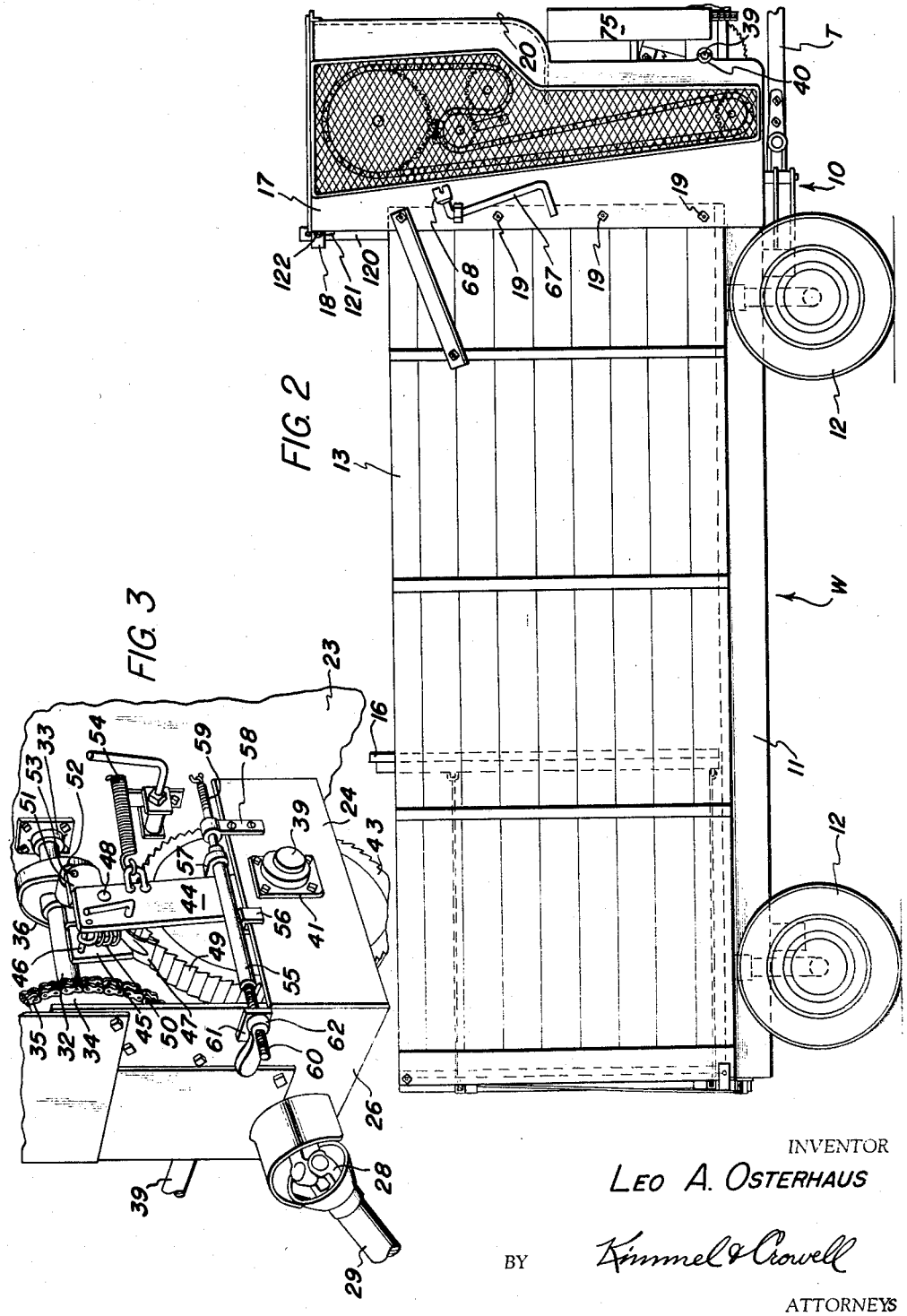

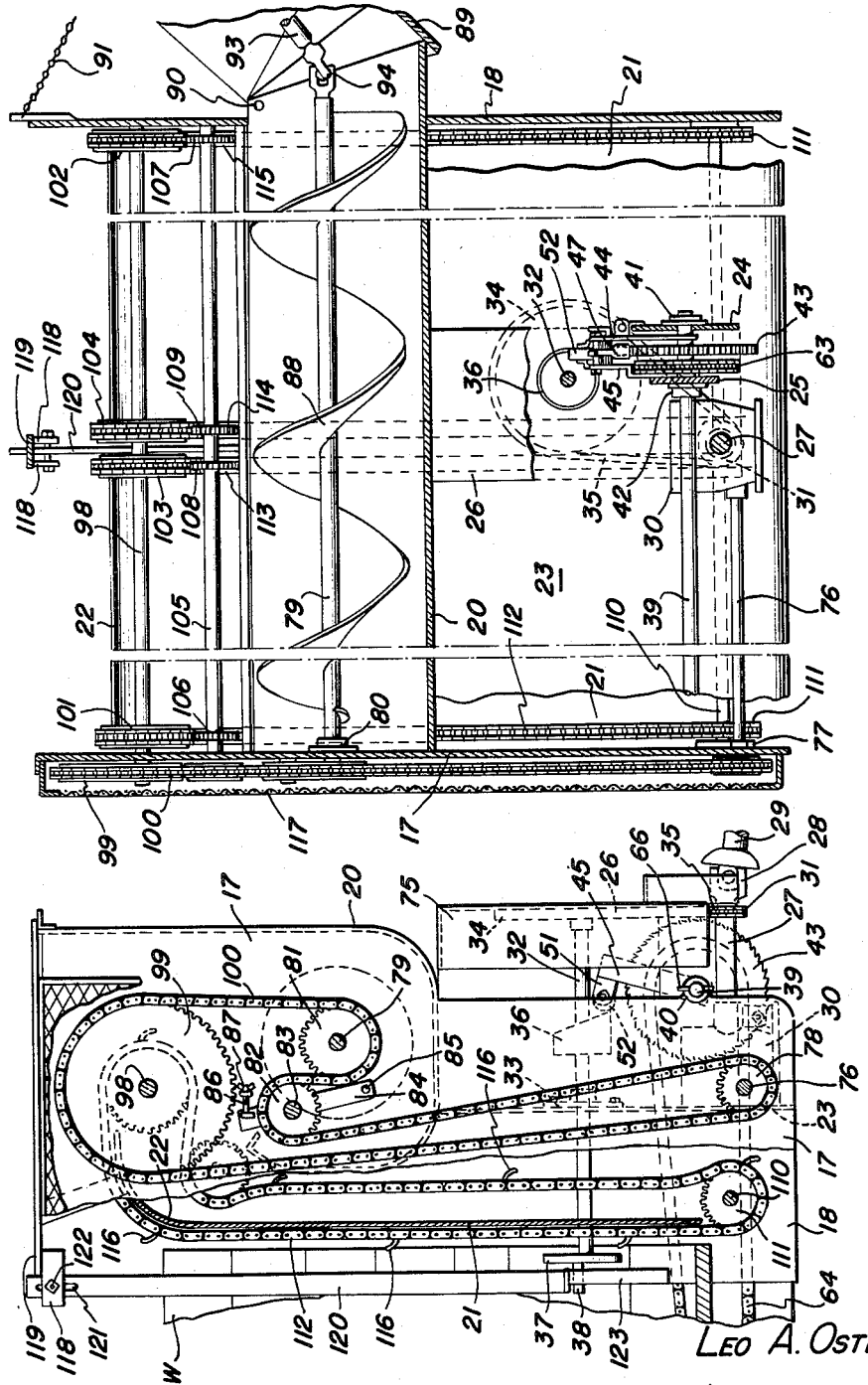

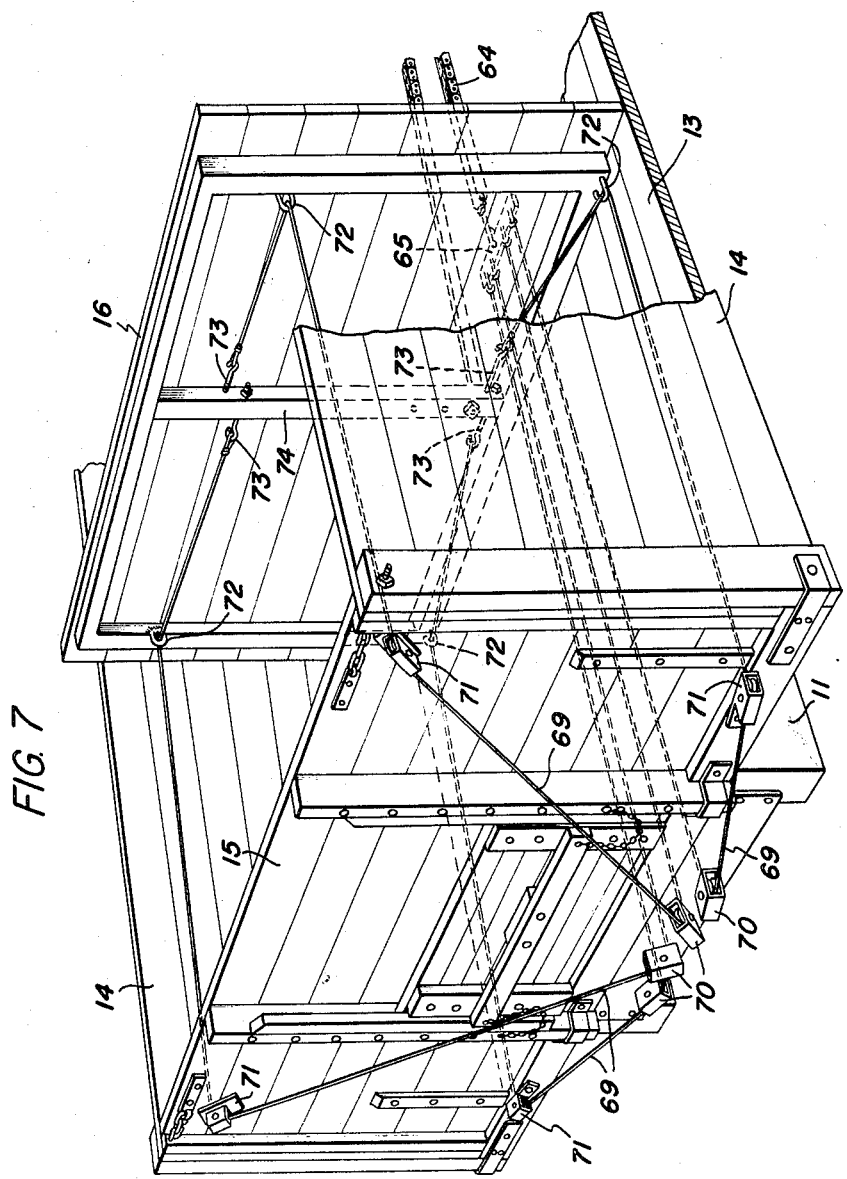

United States Patent Office 2,931,529
Patented Apr. 5, 1960

2,931,529

FEED MIXER AND UNLOADER UNIT ATTACHMENT FOR WAGONS

Leo A. Osterhaus, Dyersville, Iowa, assignor to Silver Streak Manufacturing Company, Dyersville, Iowa, a corporation of Iowa Application April 29, 1958, Serial No. 731,649

1 Claim. (Cl. 214—519)

The present invention relates to automatic feed mixer and unloader unit attachments for wagons or trucks, and is of the type for conveying the feed into bunks.

The primary object of the invention is to provide an attachment for wagons which unloads feed from the wagon and simultaneously mixes it prior to conveying to bunks utilizing the power take-off mechanism of a tractor.

Another object of the invention is to provide an attachment of the class described above which can be secured to a conventional wagon without materially altering the wagon structure.

A further object of the invention is to provide an attachment of the class described above which is detachably secured to a wagon box with a minimum of securing elements and with a minimum of tools.

A still further object of the invention is to provide a device of the class described above which is inexpensive to manufacture, simple to attach, and which effectively unloads, mixes, and conveys feed from a wagon body.

Other objects and advantages will become apparent in the following specification when considered in the light of the attached drawings, in which:

Figure 1 is a top plan view of the invention.

Figure 2 is a side elevation of the invention.

Figure 3 is an enlarged fragmentary perspective view of the drive mechanism.

Figure 4 is an enlarged fragmentary vertical section taken along the line 4—4 of Figure 1, looking in the direction of the arrows, shown partially broken away for convenience of illustration.

Figure 5 is an enlarged fragmentary vertical section taken along the line 5—5 of Figure 1, looking in the direction of the arrows, with parts broken away for convenience of illustration.

Figure 6 is a fragmentary end elevation taken along the line 6—6 of Figure 1, looking in the direction of the arrows.

Figure 7 is a fragmentary perspective view of the wagon body.

Referring now to the drawings in detail wherein like reference characters indicate like parts throughout the several figures, the reference numeral 10 indicates generally a feed unloading, mixing, and conveying unit attachment for a wagon, indicated generally at W.

The attachment 10 is secured to a wagon W which includes a frame 11 supported on wheels 12 carrying a floor 13, upright opposite side walls 14, and a rear wall 15. A moving wall 16 extends transversely of the wagon W between the side walls 14 resting on the floor 13.

At the forward end of the wagon W, a pair of spaced parallel upright side plates 17, 18 are secured by bolts 19 to the side walls 14. The upright plates 17, 18 are connected by a transversely extending housing 20 which terminates at a point substantially above the lower ends of the side plates 17, 18.

An upright plate 21 extends between and connects the side plates 17, 18 forwardly of the housing 20 adjacent the front end of the wagon W. The plate 21 is curved forwardly at its upper end to provide an arcuate offset upper end portion 22. Spaced forwardly from the plate 21 and parallel thereto is a partition 23 extending from the lower end of the housing 20 to the bottom of the side plates 17, 18.

A pair of spaced parallel longitudinally extending frame members 24, 25 extend forwardly from the forward lower edge of the partition 23 and have their forward ends connected by a transverse plate 26. The transverse plate 26 extends laterally beyond the frame member 25 and has the forward end of a longitudinally extending shaft 27 journalled therethrough. A universal joint 28 is mounted on the forward end of the shaft 27 and is connected to a stub shaft 29 which is adapted to be connected to the power take-off shaft of a tractor (not shown).

A gear box 30 is mounted on the partition 23 and the rear end of the shaft 27 is connected thereto. A sprocket 31 is fixed to the shaft 27 rearwardly of but adjacent the transverse plate 26.

A shaft 32 is arranged in spaced parallel relation above the shaft 27 and is journalled in a bearing 33 supported on the partition 23. The shaft 32 has a relatively large sprocket 34 fixed to the forward end thereof and a chain 35 is trained over the sprockets 34, 31 so that the shaft 32 is rotated on rotational movement of the shaft 27. A generally cylindrical cam 36 is fixed to the shaft 32 intermediate the sprocket 34 and the bearing 33, for reasons to be assigned.

The shaft 32 has a crank disk 37 fixed to its rear end and carrying an eccentrically mounted crank pin 38 thereon.

A transverse shaft 39 has one end thereof journalled in a bearing 40 mounted on the side plate 17 and the opposite end thereof journalled in a bearing 41 mounted on the frame member 24. A bearing 42 mounted on the frame member 25 supports the shaft intermediate the opposite ends thereof.

A relatively large circular rack 43 is fixed to the shaft 39 intermediate the frame members 24, 25. A relatively narrow arm 44 is journalled on the shaft 39 intermediate the circular rack 43 and the frame member 24, and a second relatively narrow arm 45 is journalled on the shaft 39 intermediate the circular rack 43 and the frame member 25. A transverse pin 46 secures the outer ends of the arms 44, 45 together for simultaneous pivotal movement about the shaft 39.

A pawl 47 is mounted between the arms 44, 45 on a transversely extending pivot 48 and is arranged to engage the teeth 49 on the circular rack 43, as best seen in Figure 3. The pawl 47 is biased toward the teeth 49 by a coil spring 50 extending between the pin 46 and the pawl 47.

A pair of spaced parallel ears 51 extend rearwardly from the upper ends of the arms 44, 45 and have a cam follower roller 52 journalled therebetween on a pivot pin 53. The cam follower roller 52 engages the cam face of the cylindrical cam 36 and moves the arms 44, 45 forwardly about the shaft 39 as the shaft 32 is rotated.

A spring 54 is connected at one end to the arm 44 and at the opposite end to the partition 23 to normally urge the arms 44, 45 rearwardly maintaining the cam follower roller 52 in contact with the cam 36.

A longitudinal member 55 is arranged in spaced parallel relation above the frame member 24 and has a depending U-shaped guide member 56 fixedly secured thereto engaging over the upper edge of the frame member 24. A stop 57 is secured to the rear end of the member 55 and extends laterally therefrom into the path of the arm 44.

A guide bushing 58 is secured to the frame member 24 and has the rear of the member 55 slidably positioned therein. A spring 59 is connected to the rear end of the member 55 at one end and to the partition 23 at the other end normally maintaining the member 55 in its rearmost position.

A threaded forward end portion 60 integrally formed on the member 55 extends through a bushing 61 secured to the transverse plate 26. A hand operated nut 62 is threaded on the threaded end portion 60 and engages against the bushing 61 to adjust the position of the stop 57 to vary the rearmost position of the arms 44, 45 as desired.

A sprocket 63 is fixed on the shaft 39 intermediate the circular rack 43 and the frame member 25 and has an elongated chain 64 trained thereover with the upper run thereof secured centrally to the moving wall 16, as best seen in Figure 1, and the lower run thereof secured to a spreader bar 65 at the rear end thereof.

The shaft 39, at its outer end, is provided with a cross pin 66 and a crank 67 having a slotted socket 68 engaged thereover to rotate the shaft 39 in a reverse direction from that effected by the pawl 47 to return the moving wall 16 to its rearmost position at the end of an unloading operation.

A plurality of cables 69 each have their forward ends connected to the spreader bar 65 and are trained over one of a plurality of sheave blocks 70 secured to the rear of the frame 11, and then over one of a second plurality of sheave blocks 71 secured to the rear of the wagon W at the upper and lower corners thereof.

The cables 69 extend forwardly in spaced apart parallel relation engaging through guide eyes 72 fixed to the four corners of the moving wall 16, as best seen in Figure 7. Eye bolts 73 extend transversely through an upright member 74 on the moving wall 16 serving as adjustable anchors for the ends of the cables 69 opposite the ends connected to the spreader bar 65.

The cables 69 are maintained under tension by means of the eye bolts 73 and on movement of the chain 64, as the sprocket 63 is rotated, the moving wall 16 is moved longitudinally of the wagon W while being held in a vertical position therein by the cables 69. Obviously, the forward movement of the moving wall 16 will move the contents of the wagon W forwardly therein.

A cover 75 is secured to the transverse plate 26 and serves to guard the user of the equipment from inadvertent contact with the working parts thereof.

A transverse shaft 76 is connected at one end to the gear box 30 and is journalled in a bearing 77 carried by the side plate 17 adjacent the other end thereof. A sprocket 78 is fixed to the outer end of the shaft 76 beyond the side plate 17. A conveyor shaft 79 extends transversely through the housing 20 and is journalled in a bearing 80 carried by the side plate 17, as best seen in Figures 4 and 5.

A sprocket 81 is fixed to the outer end of the shaft 79 in vertically aligned relation with the sprocket 78. An idler sprocket 82 is journalled on a stub shaft 83 carried by an arm 84 pivoted at 85 to the side plate 17. A bolt 86 connected to the upper end of the arm 84 is adjusted by a wing nut 87 to vary the position of the idler sprocket 82, as described below.

The conveyor shaft 79 extends transversely of the lower part of the housing 20 and has a screw conveyor 88 secured thereto.

A delivery chute 89 is pivotally secured at 90 to one end of the housing 20 and extends laterally therefrom. The outer end of the delivery chute 89 is supported by a chain 91 fixed at its upper inner end to the side plate 18 and connected at its outer end to a brace 92 extending across the delivery chute 89. A conveyor shaft 93 is connected to the conveyor shaft 79 by means of a universal joint 94 and has its outer end journalled in a bearing 95 supported on a bracket 96. A screw conveyor 97 is secured to the shaft 93 and extends through the delivery chute 89, as best shown in Figure 1.

A shaft 98 has its opposite ends journalled in the side plates 17, 18, respectively, and is provided with a relatively large sprocket 99 fixedly secured to one end thereof adjacent the side plate 17. The sprocket 99 is vertically aligned with the sprockets 78, 81, 82 and a chain 100 is trained thereabout with the idler sprocket 82 maintaining the chain 100 tightly in engagement with the sprockets 78, 81 and 99.

The shaft 98 is provided with a sprocket 101 adjacent the side plate 17, and a second sprocket 102 adjacent the side plate 18. A pair of sprockets 103, 104 are fixed to the shaft 98 adjacent the center thereof. A shaft 105 has its opposite ends journalled in the side plates 17, 18 and is provided with a sprocket 106 aligned with the sprocket 101, a sprocket 107 aligned with the sprocket 102, and a pair of sprockets 108, 109 aligned, respectively, with the sprockets 103, 104.

A shaft 110 has its opposite ends journalled, respectively, in the side plates 17, 18 and is provided with a plurality of sprockets 111 arranged in aligned relationship, respectively, with each of the sprockets 101, 102, 103 and 104.

A pair of vertically extending spaced conveyor chains 112, 113 are arranged in engagement with opposite side edges of one of the plates 21 and trained over the sprockets 101, 103, 106, 108 and 111, respectively, as best seen in Figures 4 and 5.

A second pair of vertically extending laterally spaced conveyor chains 114, 115 engage against the forward face of the second plate 21 and are trained over the sprockets 104, 102, 109, 107 and 111, respectively.

Transversely extending conveyor cups 116 are arranged in vertically spaced horizontal relation between the chains 112, 113 and between the chains 114, 115 with their opposite ends secured to the chains 112, 113 and 114, 115, respectively, for movement therewith. The conveyor cups 116 move upwardly along the plates 21 at the front of the wagon W conveying material upwardly and across the arcuate offset upper end portion 22 of the plates 21 into the housing 20 from which it is removed by the screw conveyors 88 and 97.

A protecting screen 117 is arranged in spaced parallel relation to the side plate 17 overlying the sprockets 78, 81, 82 and 99 to prevent accidental contact therewith by the user of the equipment.

A pair of arms 118 extend rearwardly in spaced parallel relation from a frame member 119 fixed to the upper end of the housing 20. The spaced parallel arms 118 have a vertically extending bar 120 positioned therebetween and having a vertically extending slot 121 therein engaged over a bolt 122 extending through the arms 118.

A conveying and mixing paddle 123 is positioned in generally upright relation below the bar 120 and has a right angularly extending upper end portion 124 rigidly secured to a right angularly extending lower end portion 125 on the bar 120. The upper end portion 124 of the paddle 123 is journalled on the crank pin 38 of the disk 37 so that on rotation of the shaft 32, the paddle 123 is rotated, moving the material contacted thereby to each side of the center.

In the use and operation of the invention, the wagon W is connected by means of its tongue T to a tractor (not shown) with the stud shaft 29 connected to the power take-off of the tractor. The wagon W is moved through the field with the movable wall 16 positioned at the rear end of the wagon W. The space between the side walls 14 forwardly of the moving wall 16 is filled with feed and when the filling job is complete the wagon W is moved to a discharge point.

The chute 89 is aligned with additional conveying mechanism or a discharge bin, and the shaft 27 is rotated by operating the power take-off mechanism of the tractor. Upon rotation of the shaft 27, the shaft 76 and chain 100 is driven, driving the shafts 79 and 98 to operate the conveyor 88, conveyor 97, as well as the conveyor chains 112, 113, 114, 115 which move the conveyor cups 116 vertically. Rotation of the shaft 27 through the chain 35 rotates the shaft 32 and the cam 36, oscillating the arms 44, 45 about the shaft 39 to rotate the circular rack 43 by means of the pawl 47.

The stop 57 can be adjusted to limit the back stroke of the arms 44, 45, and hence to limit the number of teeth passed over by the pawl 47 on each rear stroke thereof. Obviously, this will have the effect of governing the amount of rotation of the circular rack 43 on each stroke of the pawl 47, and hence will control the forward movement of the moving wall 16 with respect to the rotation of the shaft 27.

The paddle 123, the conveyor cups 116, the screw conveyor 88, and the screw conveyor 97 all serve dual conveying and mixing functions so that the feed discharged from the chute 89 is thoroughly mixed and in condition for storage.

Having thus described the preferred embodiment of the invention, it should be understood that numerous structural modifications and adaptations may be resorted to without departing from the scope of the appended claim.

What is claimed is:

A feed mixing and unloading unit attachment for wagons of the type including a rear wall, a bottom wall and spaced parallel side walls extending upwardly therefrom, comprising a transverse upright movable wall adapted to be positioned on the bottom wall between the side walls, means for moving said movable wall forwardly, and means including a cable secured to each corner of the movable wall and extended through the rear wall, pairs of pulleys on the side of said rear wall opposite said movable wall, each cable being extended over a pair of pulleys and thence forwardly beneath said bottom wall, for moving said movable wall rearwardly, a supporting frame work detachably secured to the forward end of the wagon, an endless vertical conveyor including a drive shaft having a sprocket thereon, for conveying feed upwardly from the forward end of the wagon, a housing supported on said frame work and mounted forwardly of the vertical conveyor for receiving feed discharged from the vertical conveyor, a horizontal transverse screw conveyor having a drive shaft and a sprocket thereon in said housing, chain means adapted to be driven by power means extended over said sprockets for simultaneously driving said vertical and horizontal conveyors, additional chain means connected to said movable wall for moving said movable wall forwardly, ratchet and pawl means associated with said additional chain means for moving said movable wall, means for varying relationship of the pawl and ratchet to vary the speed of movement of said movable wall, and manual means connected to said cables for returning said movable wall to the rear end of the wagon.

References Cited in the file of this patent
UNITED STATES PATENTS

| | | |
|---|---|---|
| 2,694,499 | Mohrlang et al. | Nov. 16, 1954 |
| 2,756,887 | Raney et al. | July 31, 1956 |